United States Patent [19]

Page et al.

[11] Patent Number: 5,750,594

[45] Date of Patent: *May 12, 1998

[54] INK SET AND PROCESS FOR ALLEVIATING BLEED IN PRINTED ELEMENTS

[75] Inventors: Loretta Ann Grezzo Page, Newark; Kathryn Amy Pearlstine, Wilmington, both of Del.

[73] Assignee: E. I. du Pont de Nemours and Company, Wilmington, Del.

[*] Notice: The portion of the term of this patent subsequent to Aug. 4, 2015, has been disclaimed.

[21] Appl. No.: 820,917

[22] Filed: Mar. 19, 1997

Related U.S. Application Data

[63] Continuation of Ser. No. 500,723, Jul. 11, 1995, abandoned.

[51] Int. Cl.$^6$ ............................................. C09D 11/10
[52] U.S. Cl. .................. 523/161; 524/555; 260/DIG. 38; 347/100; 106/31.76; 106/31.86
[58] Field of Search ................ 523/161; 260/DIG. 38; 347/100; 106/31.76, 31.86; 524/555

[56] References Cited

U.S. PATENT DOCUMENTS

| | | | |
|---|---|---|---|
| 5,019,166 | 5/1991 | Schwarz | 106/31.43 |
| 5,085,698 | 2/1992 | Ma et al. | 524/388 |
| 5,091,005 | 2/1992 | Mueller et al. | 106/31.43 |
| 5,116,409 | 5/1992 | Moffatt | 106/31.43 |
| 5,181,045 | 1/1993 | Shields et al. | 347/43 |
| 5,198,023 | 3/1993 | Stoffel | 106/31.32 |
| 5,518,534 | 5/1996 | Pearlstine et al. | 106/31.75 |
| 5,555,008 | 9/1996 | Stoffel et al. | 347/100 |

FOREIGN PATENT DOCUMENTS

| | | | |
|---|---|---|---|
| 0 556 649 A1 | 8/1993 | European Pat. Off. | C09D 11/00 |
| 0 586 079 A1 | 3/1994 | European Pat. Off. | C09D 11/00 |
| 0 633 142 A1 | 1/1995 | European Pat. Off. | B41M 5/00 |

OTHER PUBLICATIONS

*The American Heritage Dictionary*, Second College Edition, Houghton Mifflin Company, Boston, 1985, pp. 70 & 886.

Primary Examiner—Vasu Jagannathan
Assistant Examiner—John J. Guarriello

[57] ABSTRACT

Bleed between two adjacent inks on a printing medium may be reduced by selecting inks having the same ionic character, at least one ink containing an aqueous carrier medium and a pigment dispersion wherein the dispersant is a quaternized amine containing polymeric dispersant, and wherein the second ink contains an aqueous carrier medium, a colorant and optionally a polymer, wherein the colorant or the polymer has a sulfonate or phosphonate group. A process for alleviating bleed in printed elements comprising applying the first and second inks to a substrate in contact with each another is also described.

19 Claims, No Drawings

INK SET AND PROCESS FOR ALLEVIATING BLEED IN PRINTED ELEMENTS

This is a continuation of application Ser. No. 08/500,723, filed Jul. 11, 1995, now abandoned.

FIELD OF THE INVENTION

This invention relates to a method of making printed elements. More particularly, this invention relates to a method of making printed elements having reduced color bleed.

BACKGROUND OF THE INVENTION

There are many methods of making printed elements in which printing liquids are applied to a substrate to form an image. The term "printing liquid", as it is commonly understood in the art, means a colorant in a liquid media, as distinguished from solid and dry colorants, and includes paint, toners, inks, etc. The liquid media may be an organic solvent ("solvent based") or water ("aqueous based"). The colorant may be a dye or a pigment. Other ingredients typically are present in the printing liquid, depending upon the particular printing technique being employed.

Exemplary methods of using printing liquids include gravure and press printing, xerographic techniques using liquid toners, and ink jet printing, to name but a few. Of these methods, ink jet printing has become increasingly popular, particularly for so-called "desk-top publishing" applications, because of its ability to make multi-color prints by introducing three or four primary inks on a substrate in a single pass. Other printing methods generally require at least one pass through the printer for each primary color.

Despite the breadth of techniques available for making printed elements, a common problem can arise when a multi-colored element is desired in which a printing liquid of one color is placed in abutting relationship to a printing liquid of another color. This problem is manifested in a mixing or "bleeding" of the two printing liquids at their interface, whereby the line of demarcation between the two printing liquids is obscured. Bleeding may cause undesired color formation at the interface and a concurrent loss of resolution, color separation, edge acuity and color purity in the image. The more contrasting the two adjacent liquids are in color (such as black and yellow), the more visual the bleed. Bleed is also particularly noticeable when the mixing of two inks produces a secondary color, such as when blue and yellow mix to produce green.

Bleed is a particular problem in ink jet printing because the relatively low viscosity inks used therein tend to spread and because ink jet printers have the capability of printing three or four primary colors in simultaneous (or near simultaneous) fashion.

Several methods have been proposed to prevent bleed of adjacent printing liquids. The most obvious method is to apply the two printing liquids at a distance from one another such that no intermingling or mixing of the printing liquids can occur. This method is not a solution to the problem, however, and produces images having poor resolution.

Another method, and the one most commonly used, involves delay in applying the second printing liquid until the first printing liquid is completely dry. This method is also disadvantageous, not only because of its inefficiencies, but also because it is not particularly effective. For example, it has been observed that bleed may occur even if the first printing liquid is dry, which is believed to be caused by the colorants of the first printing liquid becoming "redissolved" in the liquid medium of the second printing liquid. Thus, the more soluble the components of the first printing liquid in the liquid medium, the more likely bleed will occur even if the first printing liquid is dry. This method is particularly disadvantageous in ink jet printing applications because it places an arbitrary limitation on the efficiency of generating multi-colored prints.

U.S. Pat. No. 5,091,005 teaches that the addition of formamide to the inks will reduce the occurrence of bleed in some circumstances. Yet another approach to control bleed is to increase the rate of penetration of the printing liquid into the substrate, which has its own shortcomings. First, it is inherently limited to those printing applications using particular printing liquid/substrate combinations. For example, highly absorbant substrates may be required to control bleed. Second, bleed will still be apparent unless the first printing liquid becomes bound to the substrate such that it will not be dissolved by the liquid medium of the second printing liquid. Third, known ways of increasing penetration have disadvantages in that they have a tendency to degrade text quality.

A combination of the above approaches is disclosed in U.S. Pat. No. 5,116,409, which discloses use of zwitterionic surfactants or non-ionic amphiphiles in concentrations above their respective critical micelle concentration. The formation of micelles containing dye molecules is said to prevent the dye molecules in each ink from mixing.

U.S. Pat. No. 5,181,045 teaches a method of ink jet printing wherein one of inks contains a dye that becomes insoluble under defined pH conditions and the other ink has a pH that renders the dye contained in the first ink insoluble. This method is inherently limited, however, to a specific group of dyes as colorants. In addition, the ink formulations are also constrained by the need for pH buffers, for example, which further limits the utility of that method.

EP 0586 079 A1 discloses a method for preventing color bleed between two different color ink compositions wherein the first ink is anionic and comprises a coloring agent which includes one or more carboxyl and/or carboxylate groups, and the second ink includes a precipitating agent which is designed to ionically crosslink with the coloring agent in the first ink to form a solid precipitate in order to prevent bleed between the two ink compositions. Multivalent metal salts are disclosed as being useful as the precipitating agent. Although this approach provides effective bleed control for two inks, addition of salts may cause ink flocculation and nozzle pluggage.

Dyes are a common colorant used in ink jet printing due to their solubility in water. In addition, dyes provide vibrant chromatic colors on plain paper. Unfortunately, however, many dyes possess poor resistance to light, water and handling on paper. Consequently, dye colorants have deficiencies for archiving print samples.

Pigment colorants have been used as an alternative for dyes since they generally possess excellent light and water fastness. However, most pigments do not achieve the same color intensity (i.e., "chroma") on plain paper as dyes.

One approach to improve pigment chroma is to employ a vehicle that holds the colorant on the paper surface rather than allowing the pigment to diffuse into the paper. Such vehicles tend not to penetrate into the paper, however, and are not adapted for quick drying or bleed control.

Another approach to improving pigment chroma is to use a specially coated media which helps keep the colorant on the surface of the paper. However, such media typically is more expensive than paper. Furthermore, one is restricted to printing only with the special media.

Accordingly, there is a need for an improved method for printing multi-colored images that does not present the bleed problem discussed above. Moreover, there is a particular need for such an improved method that achieves the favorable color chroma that may be obtained with dye colorants on plain paper, while providing the excellent resistance to water and light obtainable with pigment colorants.

SUMMARY OF THE INVENTION

It now has been found that bleed between two adjacent inks on a printing medium may be reduced by selecting inks having the same ionic character, at least one ink comprising a pigment dispersion wherein the dispersant is a polymeric dispersant having at least one quaternized amine group, and wherein the second ink contains a colorant or a polymer having a sulfonate or phosphonate group. Accordingly, in one embodiment the present invention provides an ink set for alleviating bleed in multicolor printed elements comprising:

(a) a first pigmented cationic ink comprising:
  (i) an aqueous carrier medium,
  (ii) a pigment, and
  (iii) a polymeric dispersant containing at least one quaternized amine group;
(b) a second cationic ink comprising:
  (i) an aqueous carrier medium,
  (ii) a colorant, and
  (iii) up to 20% of a polymer, wherein the colorant or the polymer has at least one sulfonate or phosphonate group.

In another embodiment, the invention provides a process for creating a multicolor printed element having reduced color bleed comprising:

(a) providing a first pigmented cationic ink comprising:
  (i) an aqueous carrier medium,
  (ii) a pigment, and
  (iii) a polymeric dispersant containing at least one quaternized amine group;
(b) providing a second cationic ink comprising:
  (i) an aqueous carrier medium,
  (ii) a colorant, and
  (iii) up to 20% of a polymer, wherein the colorant or the polymer has at least one sulfonate or phosphonate group; and
(c) applying the first ink and the second ink to a substrate in contact with each other.

While the invention may be used in a variety of applications, it is particularly well adapted for use in ink jet printing, more specifically in thermal ink jet printing applications. While the inks typically will be applied in abutting relationship on the medium, the inks also may be applied in an overlay relationship.

DETAILED DESCRIPTION OF THE INVENTION

The present invention will now be described in detail with particular reference to aqueous ink jet ink compositions. The invention, however, has application with other printing liquids and in other printing techniques.

Aqueous cationic inks suitable for use in this invention have an aqueous carrier medium and contain a colorant, which may be a pigment dispersion or a dye, or combinations thereof. The first ink must contain a pigment dispersion, but the second ink may contain a pigment dispersion or a dye (or combination) as the colorant. It has been found that the advantages of reduced bleed characteristics in the printed element are observed in such combinations, wherein the inks are in abutting relationship to one another, as long as the first ink has a polymeric dispersant containing at least one quaternized amine group and the second ink jet ink contains a colorant or a polymer having sulfonate or phosphonate groups. The first and second inks also have the same ionic character, i.e. both the first and second inks are cationic. When two pigmented cationic inks are used, the dispersants must be neutralized with two different acids or quaternizing agents. It has also been found that the advantages of improved color in the printed element are observed in such combinations, wherein the inks are in overlay relationship to one another. The resulting printed images are of high quality in that individual dots are round with sharp edges, and there is little feathering or strike through.

INK COMPOSITION

As mentioned above, the first and second aqueous ink jet inks suitable for use in the present invention must have the same ionic character, i.e. both inks are cationic. The first ink comprises an aqueous carrier medium, a pigment and a polymeric dispersant having at least one quaternized amine group, and the second ink comprises an aqueous carrier medium, a colorant (which may be either a pigment, a dye, or combinations thereof) and up to 20% of a polymer. When a pigment is present in the second ink, the polymer may function as a polymeric dispersant. The colorant or the polymer in the second ink contains at least one sulfonate group or phosphonate group. The inks may also contain other additives as mentioned below or known in the art of ink jet printing.

AQUEOUS CARRIER MEDIUM

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and a water-soluble solvent, the aqueous carrier medium usually contains from about 30% to about 95% water with the balance (i.e., 70 to 5%) being the water-soluble solvent. The preferred compositions are approximately 60% to about 95% water, based on the total weight of the aqueous carrier medium.

The amount of aqueous carrier medium in the ink is in the range of approximately 70 to 99.8%, preferably 94 to 99.8%, based on total weight of the ink when an organic pigment is selected; approximately 25 to 99.8%, preferably 70 to 99.8% when an inorganic pigment is selected; and 80 to 99.8% when a dye is selected.

COLORANTS

The colorants useful in the present invention may be a pigment or a dye or combinations thereof. A pigment is a colorant that is applied in an insoluble particulate state. A dye is a colorant that is applied in a soluble state. Disperse dyes which are aqueous carrier medium insoluble colorants are also useful as colorants.

PIGMENTS:

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

DYES:

Dyes which may be present in the second ink include anionic, cationic, amphoteric and non-ionic dyes. Such dyes are well known in the art. Anionic dyes are those dyes which, in aqueous solution, yield colored anions and cationic dyes are those which, in aqueous solution, yield colored cations. Typically anionic dyes contain carboxylic or sulfonic acid groups as the ionic moiety and encompass all acid dyes. Cationic dyes usually contain quaternary nitrogen groups and encompass all basic dyes.

The types of anionic dyes most useful in this invention are Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful include the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known in the art. Disperse dyes which are aqueous carrier medium insoluble colorants are also useful in this invention.

These dyes may contain sulfonate or phosphonate groups which will assist in destabilizing the quaternized polymeric dispersant containing inks.

The color and amount of dye used in the ink composition is largely a function of choice, being primarily dependent upon the desired color of the print achieved with the ink, the purity of the dye and its strength. Low concentrations of dye may not give desired color vividness. High concentrations may result in poor printhead performance or unacceptably dark colors. The dye is present in the amount of 0.01 to 20%, by weight, preferably 0.05 to 8%, by weight, most preferably 1 to 5%, by weight, based on the total weight of the ink.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

POLYMER

The first ink contains a polymeric dispersant having at least one quaternized amine group. The second ink contains a polymer which functions as a polymeric dispersant if the second ink is a pigment-based ink, or an additive if the second ink is a dye-based ink. The polymer in the second ink may be neutralized with p-toluene sulfonic acid, benzene sulfonic acid, xylene sulfonic acid, 2-acrylamido-2-methyl propane sulfonic acid, sulfanaic acid, sulfonic acid, phosphonic acid, amino ethyl phosphonic acid, butyl phosphonic acid, ethyl phosphonic acid or phenyl phosphonic acid to introduce sulfonate or phosphonate groups.

Polymers useful as polymeric dispersants or polymeric additives include AB, BAB, or ABC block copolymers. In AB or BAB block copolymers, the A segment is a hydrophobic homopolymer or copolymer which serves to link with the pigment and the B block is a hydrophilic homopolymer or copolymer, or salts thereof, and serves to disperse the pigment in the aqueous medium. Such polymeric dispersants and the synthesis thereof are disclosed in Ma et al., U.S. Pat. No. 5,085,698. ABC triblocks are also useful as pigment dispersants. In the ABC triblock, the A block is a polymer compatible with water, the B block is a polymer capable of binding to the pigment and the C block is compatible with the organic solvent. The A and C blocks are end blocks. ABC triblocks and their synthesis are disclosed in Ma et al., European Patent Application 0 556 649 A1 published Aug. 28, 1993.

Although random copolymers can be used as dispersing agents, they are not as effective in stabilizing pigment dispersions as the block polymers, and therefore are not preferred. Useful random interpolymers have narrowly controlled molecular weight ranges preferably having poly dispersivities of 1–3, preferably 1–2. These polymers are substantially free of higher molecular weight species that readily plug pen nozzles. Number average molecular weight must be less than 10,000 Daltons, preferably less than 6,000, most preferably less than 3,000. As with the above-described block polymers, these random polymers contain hydrophobic and hydrophilic monomer units. Commercial random dispersant polymers will plug pen nozzles readily. However, needed molecular weight control can be obtained by using the Group Transfer Polymerization technique, or other methods that deliver low dispersivity. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl [meth]acrylate and salts thereof. Also quaternary salts of dimethylaminoethyl [meth]acrylate may be employed.

The polymeric dispersants useful in the first ink are quaternized with benzyl chloride, methyl iodide, methyl sulfate, dimethyl sulfate, etc.

OTHER INGREDIENTS

Consistent with the particular application, various types of additives may be used to modify the properties of the ink composition. Anionic, nonionic, or amphoteric surfactants may be used in addition to the polymeric dispersants. A detailed list of non-polymeric as well as some polymeric surfactants are listed at pages 110–129, of 1990 McCutcheon's Functional Materials, North American Edition, Manufacturing Confection Publishing Co., Glen Rock, N.J. The choice of a specific surfactant is highly dependent on the particular ink composition and type of media substrate to be printed. One skilled in the art can select the appropriate surfactant for the specific substrate to be used in the particular ink composition. In aqueous inks, the surfactants may be present in the amount of 0.01–5% and preferably 0.2–2%, based on the total weight of the ink.

Cosolvents may be included to improve penetration and pluggage inhibition properties of the ink composition, and in fact are preferred. Such cosolvents are well known in the art. Representative cosolvents that can be used to advantage are exemplified in U.S. Pat. No. 5,272,201. Biocides may be used to inhibit growth of microorganisms. Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate are examples of such biocides. Sequestering agents such as EDTA may also be included to eliminate deleterious effects of heavy metal impurities. Other additives, such as humectants, viscosity modifiers and other acrylic or non-acrylic polymers may also be added to improve various properties of the ink compositions as desired.

MULTIPLE COLORS

For printing applications requiring more than two colors, the present invention may be used in combination with other known means of flocculating, precipitating or fixing ink.

INK PROPERTIES

Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cp to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out speedily and surely. The printed ink images have clear color tones, high density, excellent water resistance and light fastness. Further the ink does not corrode parts of the ink jet printing device it comes in contact with, and it is essentially odorless, and non-toxic.

SUBSTRATES

Substrates that may be selected in practicing this invention include all of those commonly used in generating printed elements. For ink jet ink applications, cellulose and non-cellulose type substrates may be used to advantage, with the cellulose type substrates, such as paper, being preferred. If sized, the degree of sizing for the substrate can be from 1 second to 1000 seconds as measured by the Hercules size test (HST), as described in TAPPI standards T530 PM-83. The substrate is chosen so its HST value is compatible with the volume and composition of the ink drop in the printer to be used. The preferred HST is in the range of 200 to 500 seconds, most preferably 350 to 400 seconds. Some useful papers include 100% bleached kraft composed of a blend of hard and soft wood, 100% wood free cotton vellum, and wood containing paper made translucent either by pulp beating or with additives. A preferred paper is Gilbert Bond paper (25% cotton) designated style 1057, manufactured by Mead Company, Dayton, Ohio. Other substrates include cardboard, transparent films such as polyethylene terephthalate, fabrics, etc.

This invention will now be further illustrated, but not limited by the following examples.

EXAMPLES

Polymer Preparation 1:

This shows the preparation of a cationic polymer, BZMA//DMAEMA 10//20 diblock polymer.

A 12-liter flask was equipped with a mechanical stirrer, thermometer, N2 inlet, drying tube outlet, and addition funnels. Tetrahydrofuran THF, 4002 gm, and p-xylene, 7.7 gm, were charged to the flask. The catalyst tetrabutyl ammonium m-chlorobenzoate, 2.0 ml of a 1.0M solution in acetonitrile, was then added. Initiator, 1-methoxy-1-trimethylsiloxy-2-methyl propene, 155.1 gm (0.891M) was injected. Feed I [2-dimethylaminoethyl methacrylate DMAEMA, 2801 gm (17.8M)] was started at 0.0 minutes and added over 45 minutes. One hundred minutes after Feed I was completed (over 99% of the monomers had reacted), Feed II [benzyl methacrylate, 1568 gm (8.91M) was started and added over 30 minutes.

At 400 minutes, 310 gm of dry methanol were added to the above solution and distillation begun. A total of 1725 gm of solvent was removed. I-propanol, 1783 gm, was added, after completion of the distillation. This made a BZMA//DMAEMA 10//20 diblock polymer at 49.6% solids and a Mn=5000.

Polymer Preparation 2:

The polymer from Preparation 1 was quaternized with Benzyl Chloride as follows:

The polymer was made as described in preparation 1 except that tetrahydrofuran, 1600.3 g, and mesitylene, 2.1402 g, and initiator, 1-methoxy-1-trimethylsiloxy-2-methyl propene, 62 gm (0.891M) were charged to the flask. The catalyst tetrabutyl ammonium m-chlorobenzoate, 2.0 ml of a 1.0M solution in acetonitrile, was then added. Feed I [2-dimethylaminoethyl methacrylate DMAEMA, 1120.4 gm (17.8M)] was started at 0.0 minutes and added over 30 minutes. One hundred twenty minutes after Feed I was completed (over 99% of the monomers had reacted) Feed II [benzyl methacrylate, 627.2 gm (8.91M) was started and added over 30 minutes.

At 300 minutes, 124 gm of dry methanol were added to the above solution and distillation begun. A total of 711.5 gm of solvent was removed. I-propanol, 711.4 gm, was added after completion of the distillation. Benzyl chloride, 810.0 grams was added and an additional 605.6 gms of I-propanol and the polymer solution were heated under reflux. This made a BZMA//DMAEMA-BzCl 10//20 diblock polymer at 55.24% solids and a Mn=5000. The amine group was now quaternized and had a benzyl group attached to it. A chloride ion was the counter ion.

Polymer Preparation 3:

This shows the preparation of a cationic polymer, MMA//DMAEMA 10//20 diblock polymer quaternized with benzyl chloride.

A 5-liter flask was equipped with a mechanical stirrer, thermometer, N2 inlet, drying tube outlet, and addition funnels. Tetrahydrofuran THF, 1243 gm, and p-xylene, 5.4 gm, were charged to the flask. The catalyst tetrabutyl ammonium m-chlorobenzoate, 2.0 ml of a 1.0M solution in acetonitrile, was then added. Initiator, 1-methoxy-1-trimethylsiloxy-2-methyl propene, 39.0 gm (0.224 M) was injected. Feed I [2-dimethylaminoethyl methacrylate DMAEMA, 700.8 gm (4.46M)] was started at 0.0 minutes and added over 45 minutes. One hundred minutes after Feed I was completed (over 99% of the monomers had reacted), Feed II [methyl methacrylate, 223 gm (2.23M) was started and added over 30 minutes.

At 400 minutes, 57 gm of dry methanol were added to the above solution and distillation begun. 727 gm of solvent were removed. I-propanol, 387 gm, was added after completion of the distillation. This made a MMA//DMAEMA 10//20 diblock polymer at 50.0% solids and a Mn=4,140.

The above polymer was quaternized using the following procedure:

A 3-liter flask was equipped with a mechanical stirrer, thermometer, N2 inlet, drying tube outlet, and addition funnels. The polymer from Preparation 1, 862.2 gm (2.02M of amine), was charged to the flask. Benzyl chloride, 230 gm (1.82M) was added over 30 minutes. The polymer solution was then heated to reflux for 4 hours. The amine value drops from 4.70 milliequivalents of amine/gm of solid polymer to 0.32 milliequivalents of amine/gm of polymer.

I-propanol, 342 gm, was then added to the above solution and distillation begun. 342 gm of solvent were removed. This made a benzyl chloride quaternized polymer of MMA//DMAEMA 10//20 at 52.0% solids and a molecular weight of 6300. The amine group was now quaternized and had a benzyl group attached to it. A chloride ion was the counter ion.

Polymer Preparation 4:

This shows the preparation of a cationic polymer, ETEGMA//DMAEMA-BzCl 15//5.

A 1-liter flask was equipped with a mechanical stirrer, thermometer, N2 inlet, drying tube outlet, and addition funnels. Tetrahydrofuran (THF), 200 g, was charged to the flask. The catalyst tetrabutyl ammonium m-chlorobenzoate, 2.3 ml a 0.03M solution in acetonitrile, was then added. Initiator, 1-methoxy-1-trimethylsiloxy-methyl propene, 7.5 g (0.431 mol) was injected. Feed I [2-dimethylaminoethyl methacrylate (DMAEMA) 34.1 g (0.216 mol)] was started at 0.0 minutes and added over 30 minutes. Fifteen minutes after Feed I was completed, Feed II [ethoxytriethylene glycol methacrylate (ETEGMA) 161.7 g (0.648 mol) was added over 50 minutes. The reaction was stirred overnight, and then methanol, 2.7 g (0.084 mol) was added and the solution was refluxed.

After 30 minutes the polymer was quaternized by the following procedure:

After cooling to room temperature, benzyl chloride (BzCl), 26.1 g (0.195 mol) dissolved in 100 g isopropanol was added. The reaction was heated to reflux and heated for 1 hour. The solvents were then distilled off to yield ETEGMA//DMAEMA-BzCl 15//5, 21% solids.

Polymer Preparation 5:

This shows the preparation of a cationic polymer, ETEGMA//DMAEMA-MeOTs 15//5

The procedure in Preparation 4 was followed for synthesizing the polymer. Instead of quaternizing with benzyl chloride, methyl p-toluenesulfonate (MeOTs) was used in the following procedure. After 30 minutes, the reaction was cooled and methyl p-toluenesulfonate, 36.2 g (0.195 mol) dissolved in 100 g isopropanol was added. The reaction was heated to reflux and heated for 1 hour. The solvents were then distilled off to yield ETEGMA//DMAEMA-MeOTs 15//s, 21% solids.

Dispersion preparation 1:

This shows the preparation of a cationic magenta pigment dispersion using a BZMA//DMAEMA-BzCl 10//20 diblock polymer and a 2 roll mill.

A magenta pigment dispersion was prepared using the following procedure:

The following ingredients were mixed:

| INGREDIENT | AMOUNT (GM) |
| --- | --- |
| Polymer from preparation 2, (55.24% solids) | 316 |
| Quinacridone magenta pigment (R-122 from Sun Chemical Corp Cincinnati, OH.) | 180 |
| Diethylene glycol | 16 |

This mixture was then charged to a 2 roll mill and processed for 30 minutes. This made a pigment dispersion that contained 48.37% pigment and 46.9% quaternized polymer. It had a P/D=1.5/1.

An aqueous pigment dispersion concentrate was prepared from the following ingredients by mixing for 2 hours on the paint shaker and processing at 3500 rpm in a minimill for 2 hours.

| INGREDIENT | AMOUNT (GM) |
| --- | --- |
| Pigment dispersion | 100 |
| Deionized water | 300 |

This made an aqueous, pigment concentrate that contained 11.35% pigment and had 90 mole % of the amine groups from the polymer quaternized with benzyl chloride.

Dispersion preparation 2:

This shows the preparation of a cationic yellow pigment dispersion using a BZMA//DMAEMA 10//20 diblock polymer and a 2 roll mill.

A yellow pigment dispersion was prepared using the following procedure:

The following ingredients were mixed:

| INGREDIENT | AMOUNT (GM) |
|---|---|
| Polymer from preparation 1 (50.22% solids) | 498 |
| Diarylide yellow pigment (Y-14 from Sun Chemical Corp Cincinnati, OH.) | 250 |

This mixture was then charged to a 2 roll mill and processed for 60 minutes. This made a pigment dispersion that contained 50% pigment and 50% polymer. It had a P/D=1/1. This 2 roll mill chip was then dissolved using phosphoric acid as the neutralizing agent to make an aqueous pigment concentrate.

An aqueous pigment dispersion concentrate was prepared by mixing the following ingredients with adequate stirring:

| INGREDIENT | AMOUNT (GM) |
|---|---|
| Pigment dispersion | 120 |
| Phosphoric acid, (86.0%) | 24.5 |
| Deionized water | 255 |

Additional water was added to give an aqueous pigment concentrate that contained 11.36% pigment and had 90 mole % of the amine groups from the polymer neutralized with phosphoric acid.

Dispersion preparation 3:

This describes preparation of a yellow pigment dispersion neutralized with para-toluene sulfonic acid.

This dispersion was prepared as described for dispersion 3 except that the following ingredients were mixed:

| INGREDIENT | AMOUNT (GM) |
|---|---|
| Polymer from preparation 1(50.22% solids) | 493 |
| Diarylide yellow pigment (Y-14 from Sun Chemical Corp Cincinnati, OH.) | 250 |

This mixture was then charged to a 2 roll mill and processed for 30 minutes. This made a pigment dispersion that contained 50% pigment and 50% polymer. It had a P/D=1/1.

An aqueous pigment dispersion concentrate was prepared by mixing the following ingredients with adequate stirring:

| INGREDIENT | AMOUNT (GM) |
|---|---|
| Pigment dispersion | 80.00 |
| p-toluene sulfonic acid, monhydrate | 15.17 |
| Deionized water | 305.00 |

Additional water was added to give an aqueous pigment concentrate that contained 10.32% pigment and had 90 mole % of the amine groups from the polymer neutralized with p-toluene sulfonic acid.

Dispersion Preparation 4:

This shows the preparation of a cationic magenta pigment dispersion using a MMA//DMAEMA-BzCl 10//20 diblock polymer.

A magenta pigment dispersion was prepared using the following procedure:

The following ingredients were mixed:

| INGREDIENT | AMOUNT (GM) |
|---|---|
| Polymer from preparation 3 (33.8% solids) | 79 |
| Quinacridone magenta presscake pigment, (R-122 from Sun Chemical Corp, Cincinnati, OH.) | 80 |
| Deionized water | 241 |

This mixture was processed on a minimill for 2 hours. This made a pigment dispersion that contained 10% pigment and 6.7% quaternized polymer. It had a P/D=1.5/1.

Dispersion Preparation 5:

This shows the preparation of a cationic cyan pigment dispersion using a BZMA//DMAEMA-BzCl 10//20 diblock polymer and Microfluidizer.

The following ingredients were mixed:

| INGREDIENT | AMOUNT (GM) |
|---|---|
| Polymer from preparation 2 (55.24% solids) | 181 |
| Cu phthalocyanine cyan pigment (PB 15:3- from BASF Corp, Parsippany, NJ) | 150 |
| Distilled water | 719 |

This mixture was then passed through a microfluidizer (Microfluidics Corp). This made a pigment dispersion that contained 14.3% pigment and had a P/D of 1.5/1.

Dispersion Preparation 6:

This shows the preparation of a cationic yellow pigment dispersion using a BZMA//DMAEMA 10//20 diblock polymer and a 2 roll mill.

A yellow pigment dispersion was prepared using the following procedure:

The following ingredients were mixed:

| INGREDIENT | AMOUNT (% by weight) |
|---|---|
| Polymer from preparation 1 | 50 |
| Yellow pigment, Y-74 from Sun Chemical (Corp, Cincinnati, OH.) | 50 |

This mixture was charged to a 2 roll mill and processed. This made a pigment dispersion with a P/D=1/1. This 2 roll mill chip was then dissolved using phosphoric acid as the neutralizing agent to make an aqueous pigment concentrate.

An aqueous pigment dispersion concentrate was prepared by mixing the following ingredients with adequate stirring:

| INGREDIENT | AMOUNT (GM) |
|---|---|
| Pigment dispersion | 50.0 |
| Phosphoric acid (86.0%) | 11.4 |
| Deionized water | 188.6 |

This gave an aqueous pigment concentrate that contained 10 pigment and had 80 mole % of the amine groups from the polymer neutralized with phosphoric acid.

Pigment Dispersion 7:

An aqueous ink concentrate was prepared as described in pigment dispersion 6 with the following exceptions: 15.2 gm of p-toluene sulfonic acid were used in place of 11.4 gm of phosphoric acid (86.0%) and 184.8 gm of deionized water were used in place of 188.6 gm of deionized water.

This gave an aqueous pigment concentrate that contained 10% pigment and had 80 mole % of the amine groups from the polymer neutralized with p-toluene sulfonic acid.

13

Pigment Dispersion 8:

An aqueous ink concentrate was prepared as described in pigment dispersion 6 with the following exceptions: 13.8 gm of sulfanilic acid were used in place of 11.4 gm of phosphoric acid (86.0%) and 186.2 gm of deionized water were used in place of 188.6 gm of deionized water.

This gave an aqueous pigment concentrate that contained 10% pigment and had 80 mole % of the amine groups from the polymer neutralized with sulfanilic acid.

Pigment Dispersion 9:

An aqueous ink concentrate was prepared as described in pigment dispersion 6 with the following exceptions: 17.7 gm of xylene sulfonic acid were used in place of 11.4 gm of phosphoric acid (86.0%) and 182.3 gm of deionized water were used in place of 188.6 gm of deionized water.

This gave an aqueous pigment concentrate that contained 10% pigment and had 80 mole % of the amine groups from the polymer neutralized with xylene sulfonic acid.

Pigment Dispersion 10:

An aqueous ink concentrate was prepared as described in pigment dispersion 6 with the following exceptions: 12.6 gm of benzene sulfonic acid were used in place of 11.4 gm of phosphoric acid (86.0%) and 187.4 gm of deionized water were used in place of 188.6 gm of deionized water.

This gave an aqueous pigment concentrate that contained 10% pigment and had 80 mole % of the amine groups from the polymer neutralized with benzene sulfonic acid.

Control 1:

A magenta ink with the following formula was prepared:

| INGREDIENT | AMOUNT (% by weight) |
|---|---|
| Pigment Dispersion 1 | 17.62 |
| 2-ethyl-2(hydroxymethyl)-1,3-propanediol | 18.00 |
| Deionized water | 64.37 |

A yellow ink with the following formula was prepared:

| INGREDIENT | AMOUNT (% by weight) |
|---|---|
| Pigment Dispersion 2 | 26.4 |
| 2-ethyl-2(hydroxymethyl)-1,3-propanediol | 18.0 |
| Deionized water | 55.6 |

The magenta and yellow inks were printed in adjacent areas onto Gilbert Bond paper (25% cotton, Mead Co. Dayton, Ohio) using a Hewlett-Packard 500C printer. Bleed was rated on a scale of A–F, with A being the best and F being the worst.

Bleed for this print was rated an F.

Example 1:

A magenta ink with the following formula was prepared:

| INGREDIENT | AMOUNT (GM) |
|---|---|
| Pigment Dispersion 1 | 5.2 |
| 2-ethyl-2(hydroxymethyl)-1,3-propanediol (50% solution in water) | 10.8 |
| Deionized water | 14.0 |

14

A yellow ink with the following formula was prepared:

| INGREDIENT | AMOUNT (GM) |
|---|---|
| Pigment Dispersion 3 | 8.7 |
| 2-ethyl-2(hydroxymethyl)-1,3-propanediol (50% solution in water) | 10.8 |
| Deionized water | 10.5 |

The inks were printed as described in Control 1 and the amount of bleed observed was rated as described in Control 1.

The bleed on Gilbert bond paper was rated a C.

Example 2:

As demonstrated in Example 1, inks which precipitate when mixed together show a reduction in bleed when printed in adjacent or overlapping areas.

The following dispersions were mixed together and the result was observed visually. Two grams of magenta dispersion from Preparation 4 were mixed with 2 grams of each of the following yellow dispersions:

| Yellow dispersion | Neutralizing Agent | Precipitation |
|---|---|---|
| Dispersion 6 (control) | phosphoric acid | none |
| Dispersion 7 | p-toluene sulfonic acid | Immediate |
| Dispersion 8 | sulfanilic acid | slow |
| Dispersion 9 | xylene sulfonic acid | Immediate |
| Dispersion 10 | benzene sulfonic acid | Immediate, but less effective than 7 or 9. |

The experiment was repeated using 2 grams of cyan dispersion from Preparation 5 instead of the magenta dispersion as described above. The results obtained were the same as shown in the above table.

Example 3:

As demonstrated in Example 1, inks which precipitate when mixed together show a reduction in bleed when printed in adjacent or overlapping areas.

Polymers from Polymer Preparation 4 and 5 were mixed with a cyan dispersion made with 10//20 Benzylmethacrylate//DMAEMA quaternized with benzyl chloride from Dispersion Preparation 5.

The results of the mixing are given below:

| Polymer | Quat. Agent | Precipitation |
|---|---|---|
| Preparation 4 (control) | benzyl chloride | no |
| Preparation 5 | methyl tosylate | yes |

The polymers from Preparation 4 and 5 were mixed with the yellow dispersion neutralized with phosphoric acid from Dispersion Preparation 2 as a control. Neither polymer caused precipitation of the yellow dispersion.

What is claimed is:

1. An ink set comprising, in combination:
   a) a first cationic ink comprising:
      1) an aqueous carrier medium,
      2) a pigment, and
      3) a polymeric dispersant having at least one quaternized amine group; and
   b) a second cationic ink comprising:
      1) an aqueous carrier medium, and
      2) a colorant comprising a dye selected from the group consisting of dyes containing sulfonate groups, dyes containing phosphonate groups, and mixtures thereof;

wherein said dye is present in an amount sufficient to destabilize the polymeric dispersant of the first cationic ink when the first and second cationic inks are placed in contact with one another on a substrate.

2. The ink set of claim 1 wherein the polymeric dispersant in the first ink is quaternized with at least one compound selected from the group consisting of benzyl chloride, methyl iodide, methyl sulfate and dimethyl sulfate.

3. The ink set of claim 1 wherein the pigment has a particle size of 0.005 micron to 15 micron.

4. The ink set of claim 1 wherein the pigment is present in the amount of 0.1 to 15% by weight, based on the total weight of the ink.

5. The ink set of claim 1 wherein the second ink further comprises a pigment and a polymeric dispersant.

6. The ink set of claim 5 wherein the polymeric dispersant in the second ink is a polymer neutralized with at least one compound selected from the group consisting of p-toluene sulfonic acid, benzene sulfonic acid, xylene sulfonic acid, 2-acrylamido-2-methyl propane sulfonic acid, sulfanaic acid, sulfonic acid, phosphonic acid, amino ethyl phosphonic acid, butyl phosphonic acid, ethyl phosphonic acid and phenyl phosphonic acid.

7. A process for creating a multicolor printed element having reduced color bleed, comprising the steps of:
   a) applying a first cationic ink to a substrate, said first cationic ink comprising:
      1) an aqueous carrier medium,
      2) a pigment, and
      3) a polymeric dispersant having at least one quaternized amine group; and
   b) applying a second cationic ink to the substrate and in contact with said first ink, the second ink comprising:
      1) an aqueous carrier medium, and
      2) a colorant comprising a dye selected from the group consisting of dyes containing sulfonate groups, dyes containing phosphonate groups and mixtures thereof;
   wherein said dye is present in an amount sufficient to destabilize the polymeric dispersant of the first cationic ink when the first and second cationic inks are placed in contact with one another on a substrate.

8. The process of claim 7 wherein the polymeric dispersant in the first ink is quaternized with at least one compound selected from the group consisting of benzyl chloride, methyl iodide, methyl sulfate and dimethyl sulfate.

9. The process of claim 7 wherein the pigment has a particle size of 0.005 micron to 15 micron.

10. The process of claim 7 wherein the pigment is present in the amount of 0.1 to 15% by weight, based on the total weight of the ink.

11. The process of claim 7 wherein the substrate is paper.

12. The process of claim 7 wherein the second ink further comprises a pigment and a polymeric dispersant.

13. The process of claim 12 wherein the polymeric dispersant in the second ink is neutralized with at least one compound selected from the group consisting of p-toluene sulfonic acid, benzene sulfonic acid, xylene sulfonic acid, 2-acrylamido-2-methyl propane sulfonic acid, sulfanaic acid, sulfonic acid, phosphonic acid, amino ethyl phosphonic acid, butyl phosphonic acid, ethyl phosphonic acid and phenyl phosphonic acid.

14. An ink set comprising, in combination:
   a) a first cationic ink comprising:
      1) an aqueous carrier medium,
      2) a pigment, and
      3) a polymeric dispersant having at least one quaternized amine group; and
   b) a second cationic ink comprising:
      1) an aqueous carrier medium,
      2) a colorant; and
      3) a polymer selected from the group consisting of polymers containing sulfonate groups, polymers containing phosphonate groups and mixtures thereof;
   wherein said polymer is present in an amount sufficient to destabilize the polymeric dispersant of the fist cationic ink when the first and second cationic inks are placed in contact with one another on a substrate but not more than 20% by weight based on the total weight of the second ink.

15. The ink set of claim 14, wherein said colorant in the second ink comprises a pigment.

16. The ink set of claim 15 wherein the polymer in the second ink comprises a polymeric dispersant for the pigment and is neutralized with at least one compound selected from the group consisting of p-toluene sulfonic acid, benzene sulfonic acid, xylene sulfonic acid, 2-acrylamido-2-methyl propane sulfonic acid, sulfanaic acid, sulfonic acid, phosphonic acid, amino ethyl phosphonic acid, butyl phosphonic acid, ethyl phosphonic acid and phenyl phosphonic acid.

17. A process for creating a multicolor printed element having reduced color bleed, comprising the steps of:
   a) applying a first cationic ink to a substrate; said first cationic ink comprising:
      1) an aqueous carrier medium,
      2) a pigment, and
      3) a polymeric dispersant having at least one quaternized amine group; and
   b) applying a second cationic ink to the substrate and in contact with said first ink, the second cationic ink comprising:
      1) an aqueous carrier medium,
      2) a colorant; and
      3) a polymer selected from the group consisting of polymers containing sulfonate groups, polymers containing phosphonate groups and mixtures thereof;
   wherein said polymer is present in an amount sufficient to destabilize the polymeric dispersant of the first cationic ink when the first and second cationic inks are placed in contact with one another on a substrate but not more than 20% by weight based on the total weight of the second ink.

18. The process of claim 17, wherein said colorant in the second ink comprises a pigment.

19. The process of claim 18 wherein the polymer in the second ink is a dispersant for the pigment and is neutralized with at least one compound selected from the group consisting of p-toluene sulfonic acid, benzene sulfonic acid, xylene sulfonic acid, 2-acrylamido-2-methyl propane sulfonic acid, sulfanaic acid, sulfonic acid, phosphonic acid, amino ethyl phosphonic acid, butyl phosphonic acid, ethyl phosphonic acid and phenyl phosphonic acid.

* * * * *